(12) United States Patent
Genner

(10) Patent No.: US 12,676,024 B1
(45) Date of Patent: Jul. 7, 2026

(54) SYSTEMS AND METHODS FOR PASSIVE-SUBJECT LIVENESS VERIFICATION IN DIGITAL MEDIA

(71) Applicant: T Stamp Inc., Atlanta, GA (US)

(72) Inventor: Gareth Genner, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 654 days.

(21) Appl. No.: 17/849,196

(22) Filed: Jun. 24, 2022

Related U.S. Application Data

(63) Continuation of application No. 16/855,606, filed on Apr. 22, 2020, now Pat. No. 11,373,449, which is a continuation of application No. 15/782,940, filed on Oct. 13, 2017, now Pat. No. 10,635,894.

(60) Provisional application No. 62/407,693, filed on Oct. 13, 2016, provisional application No. 62/407,817,
(Continued)

(51) Int. Cl.
| | |
|---|---|
| *G06V 40/16* | (2022.01) |
| *G06T 7/246* | (2017.01) |
| *G06V 40/10* | (2022.01) |
| *G06V 40/40* | (2022.01) |

(52) U.S. Cl.
CPC ............ *G06V 40/176* (2022.01); *G06T 7/251* (2017.01); *G06V 40/103* (2022.01); *G06V 40/165* (2022.01); *G06V 40/45* (2022.01); *G06V 40/179* (2022.01)

(58) Field of Classification Search
CPC .. G06V 40/176; G06V 40/103; G06V 40/165; G06V 40/45; G06V 40/179; G06V 40/172; G06V 40/166; G06V 40/161; G06V 40/171; G06V 40/40; G06V 40/168; G06V 10/143; G06V 40/167; G06V 10/60; G06V 40/16; G06V 10/82; G06V 10/54; G06V 10/806; G06V 40/1365; G06V 40/1382; G06V 40/174; G06V 40/178; G06T 7/251; G06T 2207/30201; G06T 11/60; G06T 17/00; G06T 2207/10016; G06T 2207/10028; G06T 7/11; G06F 21/32;
(Continued)

(56) References Cited

U.S. PATENT DOCUMENTS

| | | |
|---|---|---|
| 6,836,554 B1 | 12/2004 | Bolle et al. |
| 7,120,607 B2 | 10/2006 | Bolle et al. |
| 7,412,081 B2 | 8/2008 | Doi |

(Continued)

FOREIGN PATENT DOCUMENTS

| | | |
|---|---|---|
| CN | 103930921 A | 7/2014 |
| EP | 3065366 A1 | 9/2016 |

(Continued)

OTHER PUBLICATIONS

Rathgeb et al., "Unlinkable Improved Multi-biometric Iris Fuzzy Vault", EURASIP Journal on Information Security, 2016, 2016:26.
(Continued)

*Primary Examiner* — Michael S Osinski

(74) *Attorney, Agent, or Firm* — Bradley Arant Boult Cummings LLP; Daniel E. Sineway, Esq.

(57) ABSTRACT

The present system may be deployed in various scenarios to provide proof of liveness (also referred to herein as "liveness verification") of an image without interaction of the subject of the image. The liveness verification process generally comprises imperative analysis and dynamic analysis of the image, after which liveness of the image may be determined.

28 Claims, 4 Drawing Sheets

EXEMPLARY LIVENESS VERIFCATION PROCESS OVERVIEW

EXEMPLARY SYSTEM ARCHITECTURE

Related U.S. Application Data filed on Oct. 13, 2016, provisional application No. 62/407,852, filed on Oct. 13, 2016.

(58) Field of Classification Search
CPC ...... G06F 18/22; G06F 18/214; G06F 18/253; G06F 21/31; H04L 63/0861
See application file for complete search history.

(56) References Cited

U.S. PATENT DOCUMENTS

| | | |
|---|---|---|
| 7,773,784 B2 | 8/2010 | Boult |
| 7,822,631 B1 | 10/2010 | Vander Mey et al. |
| 8,010,460 B2 | 8/2011 | Work et al. |
| 8,249,314 B2 | 8/2012 | Bolle et al. |
| 8,312,291 B2 | 11/2012 | Golic et al. |
| 8,316,086 B2 | 11/2012 | Ufford et al. |
| 8,363,951 B2* | 1/2013 | Bigioi ................. H04N 23/611 |
| | | 382/190 |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 11,657,525 B2* | 5/2023 | Nikitidis ............... B33Y 50/02 |
| | | 382/103 |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0051632 A1* | 2/2013 | Tsai ...................... G06V 40/70 |
| | | 382/118 |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0178580 A1* | 6/2015 | Lai .......................... G06V 40/40 |
| | | 382/116 |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2015/0334567 A1* | 11/2015 | Chen ...................... G06V 10/17 |
| | | 455/411 |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0057138 A1* | 2/2016 | Hoyos .................. G06V 40/168 |
| | | 726/7 |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0162729 A1* | 6/2016 | Hagen .................... G06V 40/67 |
| | | 382/118 |

(56) References Cited

U.S. PATENT DOCUMENTS

| | | | |
|---|---|---|---|
| 2016/0173605 A1 | 6/2016 | Iasi et al. | |
| 2016/0191513 A1 | 6/2016 | Tomlinson et al. | |
| 2016/0224853 A1 | 8/2016 | Xiong | |
| 2016/0232401 A1* | 8/2016 | Hoyos | G06V 40/1376 |
| 2016/0269178 A1 | 9/2016 | Yang et al. | |
| 2016/0277397 A1* | 9/2016 | Watanabe | H04L 63/0861 |
| 2016/0277424 A1 | 9/2016 | Mawji et al. | |
| 2016/0379182 A1 | 12/2016 | Sheng et al. | |
| 2017/0006008 A1 | 1/2017 | Moran et al. | |
| 2017/0019400 A1 | 1/2017 | Drolshagen et al. | |
| 2017/0024608 A1* | 1/2017 | Kons | G06T 7/68 |
| 2017/0032485 A1 | 2/2017 | Vemury | |
| 2017/0034183 A1 | 2/2017 | Enqvist et al. | |
| 2017/0061138 A1 | 3/2017 | Lambert | |
| 2017/0082740 A1 | 3/2017 | Kitchens, II et al. | |
| 2017/0124385 A1* | 5/2017 | Ganong | G06F 16/50 |
| 2017/0134366 A1 | 5/2017 | Genner et al. | |
| 2017/0140204 A1 | 5/2017 | Derakhshani et al. | |
| 2017/0210525 A1 | 7/2017 | Mayer et al. | |
| 2017/0250796 A1 | 8/2017 | Samid | |
| 2017/0256056 A1 | 9/2017 | Jain et al. | |
| 2017/0264599 A1 | 9/2017 | O'Regan et al. | |
| 2017/0279795 A1 | 9/2017 | Redberg | |
| 2017/0286788 A1 | 10/2017 | Fan et al. | |
| 2017/0329946 A1* | 11/2017 | Levitov | H04N 23/60 |
| 2017/0331818 A1 | 11/2017 | Kader et al. | |
| 2017/0345146 A1* | 11/2017 | Fan | G06V 40/45 |
| 2017/0346851 A1 | 11/2017 | Drake | |
| 2017/0372055 A1 | 12/2017 | Robinson et al. | |
| 2018/0005019 A1 | 1/2018 | Chattopadhyay et al. | |
| 2018/0018651 A1 | 1/2018 | Nelson et al. | |
| 2018/0025217 A1* | 1/2018 | Chandraker | G06F 21/32 |
| | | | 382/118 |
| 2018/0034852 A1 | 2/2018 | Goldenberg | |
| 2018/0046852 A1* | 2/2018 | Ionita | G06V 40/167 |
| 2018/0048472 A1 | 2/2018 | Pirrwitz et al. | |
| 2018/0060648 A1 | 3/2018 | Yoo et al. | |
| 2018/0069703 A1 | 3/2018 | Chakraborty et al. | |
| 2018/0077571 A1 | 3/2018 | Mannopantar et al. | |
| 2018/0082455 A1 | 3/2018 | Yamaji et al. | |
| 2018/0096212 A1* | 4/2018 | Lin | G06F 16/5838 |
| 2018/0097806 A1 | 4/2018 | Blinn | |
| 2018/0101742 A1 | 4/2018 | Burge et al. | |
| 2018/0167388 A1 | 6/2018 | Farrell et al. | |
| 2018/0191501 A1 | 7/2018 | Lindemann | |
| 2018/0205557 A1 | 7/2018 | Sun | |
| 2018/0211092 A9 | 7/2018 | Derakhshani et al. | |
| 2018/0248699 A1 | 8/2018 | Andrade | |
| 2018/0302406 A1 | 10/2018 | Burckhardt et al. | |
| 2018/0307895 A1 | 10/2018 | Chu et al. | |
| 2019/0026544 A1* | 1/2019 | Hua | A61B 5/1128 |
| 2019/0043148 A1 | 2/2019 | Vemury | |
| 2019/0311102 A1 | 10/2019 | Tussy | |
| 2019/0312734 A1 | 10/2019 | Wentz et al. | |
| 2019/0334884 A1 | 10/2019 | Ross et al. | |
| 2019/0379541 A1 | 12/2019 | Schwach et al. | |
| 2020/0036707 A1 | 1/2020 | Callahan et al. | |
| 2020/0084191 A1 | 3/2020 | Nicholls | |
| 2020/0145219 A1 | 5/2020 | Sebastian et al. | |
| 2020/0153624 A1 | 5/2020 | Wentz et al. | |
| 2020/0186350 A1 | 6/2020 | Wentz et al. | |
| 2020/0201679 A1 | 6/2020 | Wentz | |
| 2020/0257889 A1 | 8/2020 | Merkel et al. | |
| 2020/0293640 A1 | 9/2020 | Joshi et al. | |
| 2020/0351089 A1 | 11/2020 | Wentz | |
| 2020/0351098 A1 | 11/2020 | Wentz | |
| 2020/0351657 A1 | 11/2020 | Wentz | |
| 2020/0356085 A1 | 11/2020 | Wentz et al. | |
| 2020/0404019 A1 | 12/2020 | Drake | |
| 2021/0019519 A1 | 1/2021 | Martin et al. | |
| 2021/0027080 A1 | 1/2021 | Storm et al. | |
| 2021/0034864 A1* | 2/2021 | Thavalengal | G06F 18/251 |
| 2021/0073518 A1 | 3/2021 | Kumar et al. | |
| 2021/0200993 A1* | 7/2021 | Chen | G06V 10/82 |
| 2023/0206686 A1* | 6/2023 | Matsunami | G06F 21/32 |
| | | | 382/118 |

FOREIGN PATENT DOCUMENTS

| | | | |
|---|---|---|---|
| WO | 2008010773 A1 | 1/2008 | |
| WO | 2019034589 A1 | 2/2019 | |

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

* cited by examiner

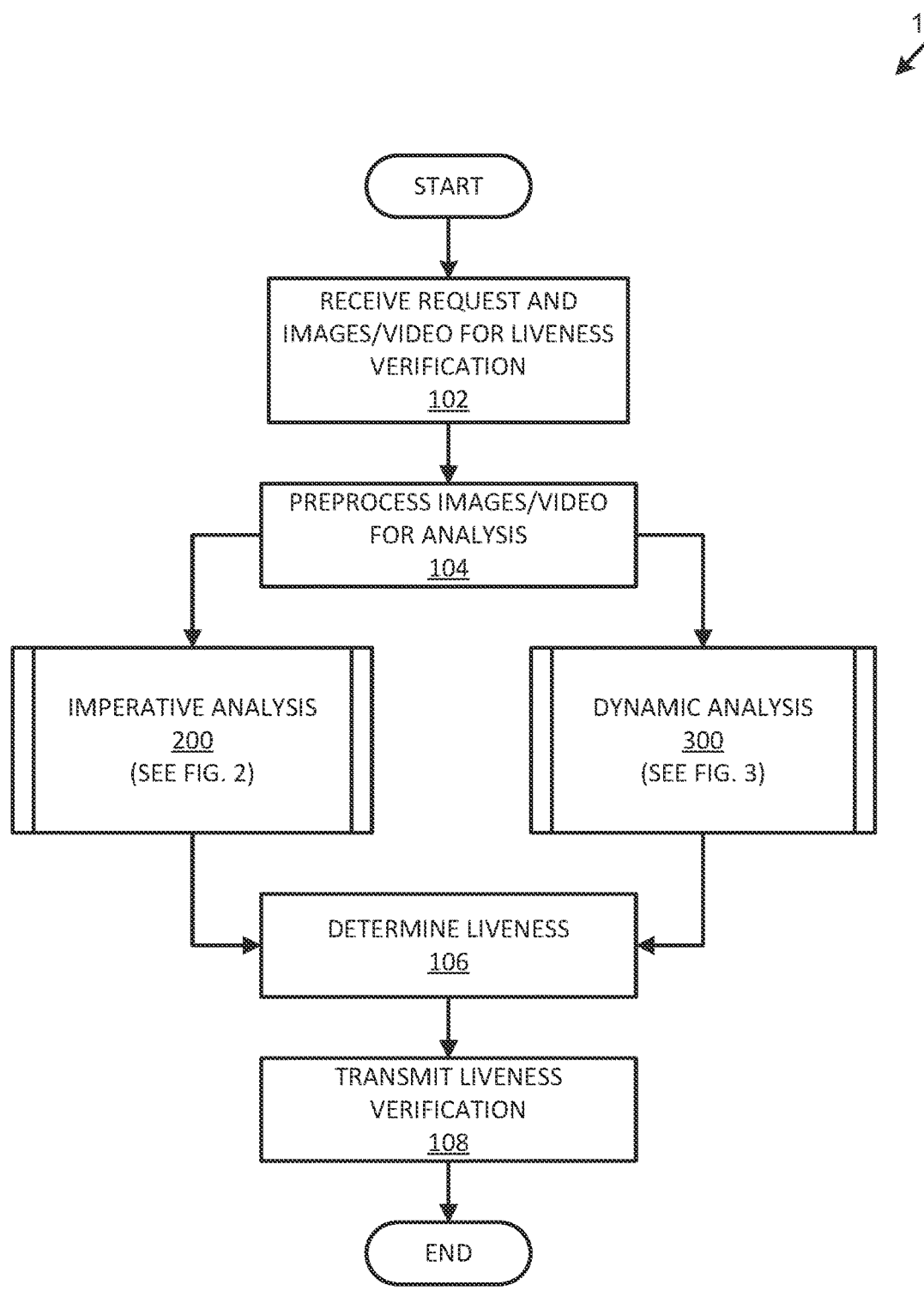
*FIG 1:* EXEMPLARY LIVENESS VERIFCATION
PROCESS OVERVIEW

200
START
RECEIVE PREPROCESSED
IMAGE(S) FOR IMPERATIVE
ANALYSIS
202
ANALYZE/CONVERT IMAGE
COLOR SPACE
204
EXTRACT CONTOURS FROM
IMAGE
208
DETERMINE WHETHER IMAGE IS
MONOCHROMATIC
206
DETERMINE WHETHER IMAGE
CONTAINS FRAME
210
TRANSMIT RESULTS OF
IMPERATIVE ANALYSIS
212
END
FIG 2: EXEMPLARY IMPERATIVE ANALYSIS PROCESS

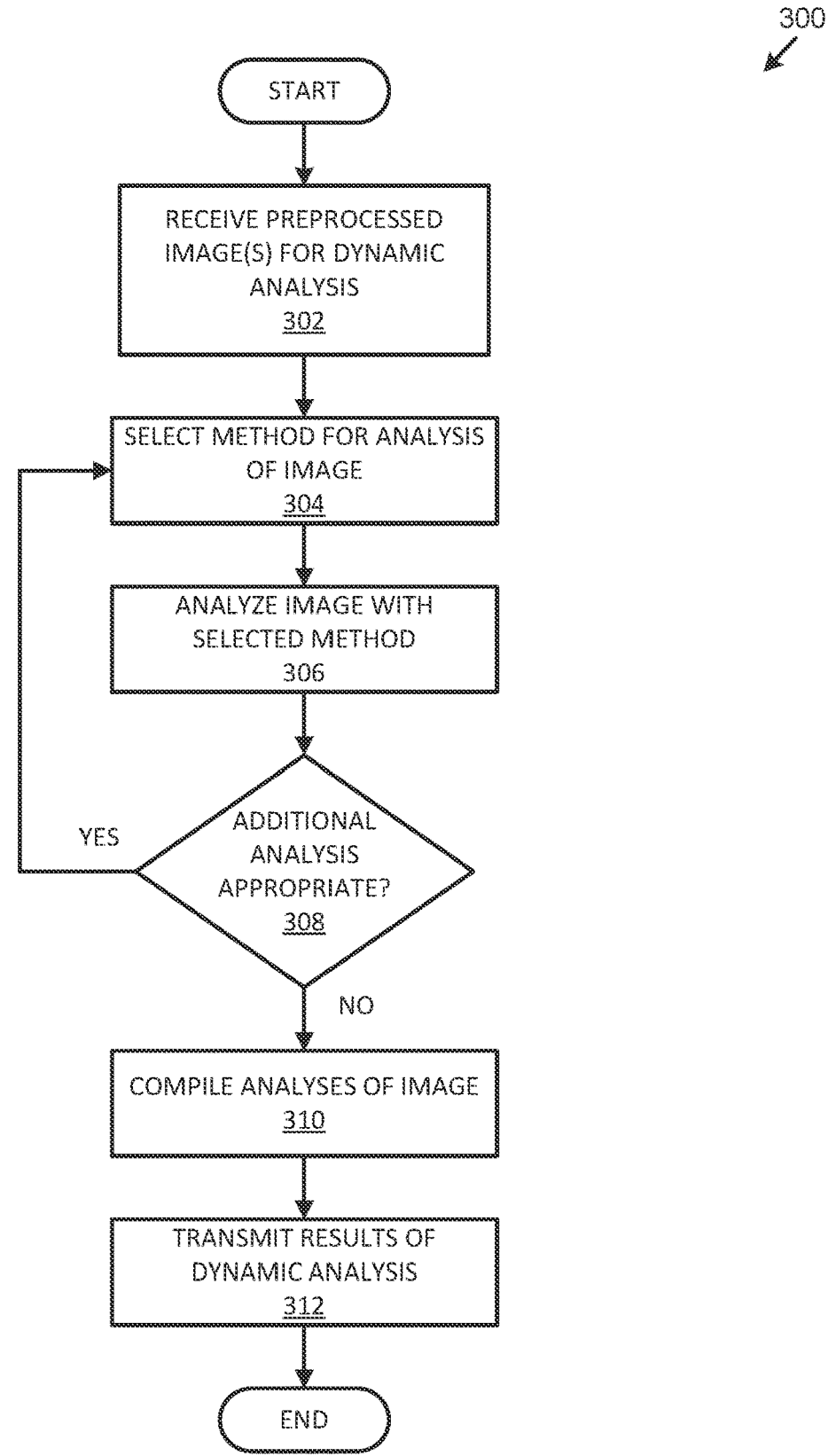
FIG 3: EXEMPLARY DYNAMIC ANALYSIS PROCESS

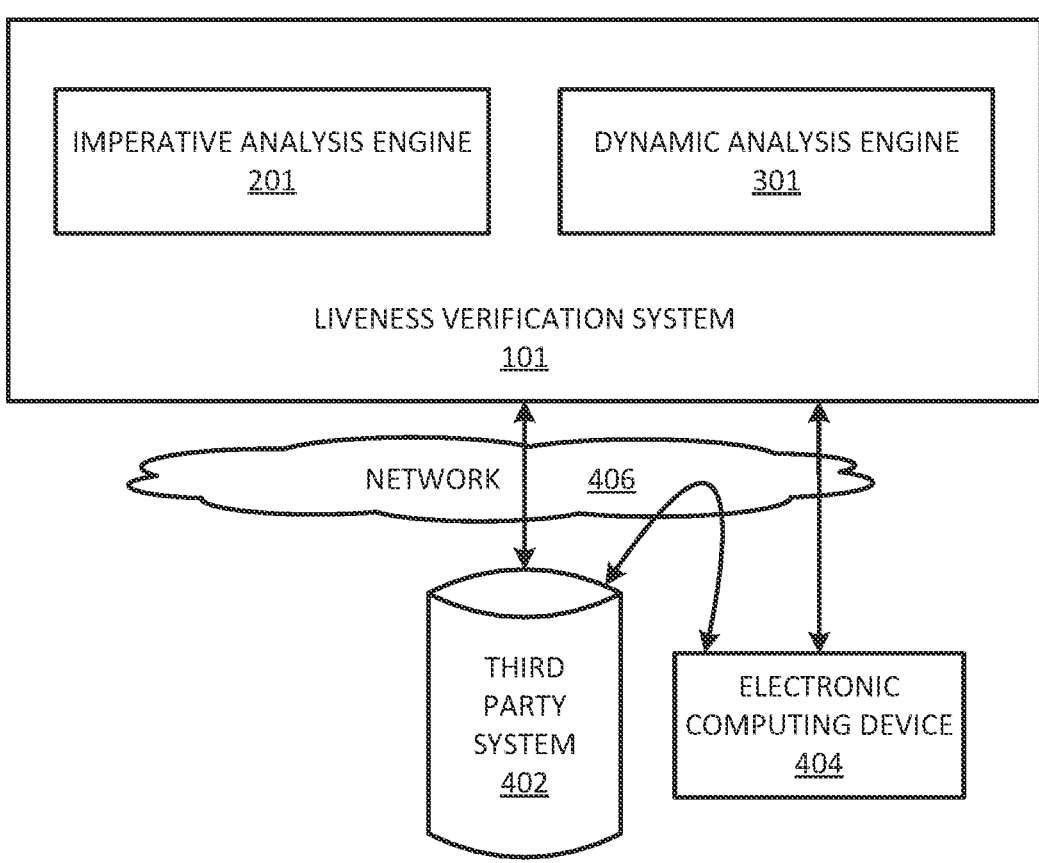
*FIG 4:* EXEMPLARY SYSTEM ARCHITECTURE

SYSTEMS AND METHODS FOR PASSIVE-SUBJECT LIVENESS VERIFICATION IN DIGITAL MEDIA

CROSS REFERENCE TO RELATED APPLICATIONS

This application is a Continuation Patent Application of, and claims the benefit of and priority to, U.S. Non-Provisional patent application Ser. No. 16/855,606, filed Apr. 22, 2020, and entitled "Systems and Methods for Passive-Subject Liveness Verification in Digital Media," which is a Continuation Patent Application of, and claims the benefit of and priority to, U.S. Non-Provisional patent application Ser. No. 15/782,940, filed Oct. 13, 2017, and entitled "Systems and Methods for Passive-Subject Liveness Verification in Digital Media," which is a Non-Provisional Patent Application of U.S. Provisional Patent Application No. 62/407,817, filed Oct. 13, 2016, and entitled "Passive-Subject Liveness Testing of Photographic Images," and U.S. Provisional Patent Application No. 62/407,852, filed Oct. 13, 2016, and entitled "Trusted Communication Stamp," and U.S. Provisional Patent Application No. 62/407,693, filed Oct. 13, 2016, and entitled "Medical Trust Stamp," the disclosures of which are incorporated by reference as if the same were set forth herein in their entireties.

TECHNICAL FIELD

The present systems and methods relate generally to digital biometric security and, more particularly, to verification of passive-subject liveness in digital media to prevent spoofing.

BACKGROUND

Establishing that a particular item of digital media (e.g., photograph, video, etc.) used for biometric security identification is an unadulterated reproduction of a live human face and not a reproduction of a photograph, a three-dimensional ("3D") representation of a human face, a digital rendering, or an adapted image of a face is an important part of the biometric digital security process that is often referred to as "proof of liveness." Existing methodologies for establishing proof of liveness typically rely upon active interactions between the subject of the digital media (e.g., the person attempting to access via biometric security identification) and the camera taking the digital media by requiring the subject to perform physical actions (e.g., winking, waving, etc.). Such methodologies are generally capable of trickery or deception, which is often referred to as "spoofing," by various known and published techniques, and generally require interaction on the part of the subject. Such live interaction, however, may not be feasible due to reluctance on the part of the subject, the time involved in explaining and executing the interaction, or a desire or need to establish liveness without the knowledge or cooperation of the subject. Further, executing an action or movement by a subject can be seen as awkward or embarrassing when performed in public.

Therefore, there is a long-felt but unresolved need for a system or method that permits passive-subject liveness verification in digital media to prevent spoofing and does not require physical movement by the subject.

BRIEF SUMMARY OF THE DISCLOSURE

Briefly described, and according to one embodiment, aspects of the present disclosure generally relate to systems and methods for verification of passive-subject liveness in digital media to prevent spoofing.

In various embodiments, the present system may be deployed in various scenarios to provide proof of liveness (also referred to herein as "liveness verification") of an image without physical interaction or movement of the subject of the image. For example, the present system may provide liveness verification as users attempt to log into or access any system protected via biometric security, such as email clients, banking systems, software systems, SaaS platforms, websites, electronic devices (e.g., smartphones, computers, watches, ATMs, etc.), cars and other vehicles, building security systems, etc. Said another way, in one embodiment, the present system may verify that an image being used for verification, authorization, or access to a system is of alive individual and not an image of an image or other type of manufactured image. In one embodiment, the present system is built into and integrated with a particular system (e.g., the particular system is enabled to perform liveness verification according to the present disclosure). In one embodiment, the present system is deployed in addition to a particular system (e.g., the particular system reaches out to the present system through APIs or other methods for liveness verification).

The liveness verification process generally begins when the system receives a request for liveness verification of an image(s) or video, as well as the image(s) or video for liveness verification. In one embodiment, the system preprocesses the image(s)/video for analysis (e.g., converting the image into different formats, resolutions, sizes, etc.; selecting image(s) for analysis; etc.). Once an image has been preprocessed, in various embodiments, the image undergoes imperative analysis and dynamic analysis. Generally, imperative analysis is the process by which the disclosed system uses various non-machine learning based methodologies (e.g., color detection, contour detection, etc.) according to one or more predefined rules to verify liveness in the preprocessed image. Generally, dynamic analysis is the process by which the disclosed system uses various machine learning based methodologies (e.g., diffusion speed, face contrast, blurriness, specularity, etc.) to verify liveness in the preprocessed image.

In various embodiments, the system determines liveness of the image based on the results of the imperative analysis and the dynamic analysis, neither of which require interaction from the subject of the image. Once the system has determined liveness (or not), in one embodiment, the system transmits the results of the liveness verification for further action as appropriate (e.g., permitting access, denying access, requesting additional verification, etc.).

In one embodiment, a method of verifying liveness of a subject shown in an image, comprising the steps of: receiving an image from an electronic computing device for liveness verification, wherein the image purports to show the face of the subject; determining that the image is not monochromatic; determining that the image does not comprise a frame surrounding the face; and analyzing the image to determine that at least one of the following regarding the image is within a predetermined range: diffusion speed, contrast, blurriness, specularity, or gamut differences.

In one embodiment, a system of verifying liveness of a subject shown in an image, comprising: an electronic computing device that transmits an image for liveness verification to a server, wherein the image purports to show the face of the subject; and the server that receives the image for liveness verification, wherein the server determines that the image is not monochromatic, determines that the image does not comprise a frame surrounding the face, and analyzes the image to determine that at least one of the following regarding the image is within a predetermined range: diffusion speed, contrast, blurriness, specularity, or gamut differences.

In one embodiment, a method of verifying liveness of a subject shown in an image, comprising the steps of: receiving an image from an electronic computing device for liveness verification, wherein the image purports to show the face of the subject; performing imperative analysis on the received image; performing dynamic analysis on the received image; and determining liveness based on the performed imperative analysis and the performed dynamic analysis.

According to one aspect of the present disclosure, the method, wherein determining that the image is not monochromatic further comprises the steps of: converting a first color space of the image to a second color space, wherein the second color space comprises two or more color components; calculating a variance in the two or more color components; and determining that the variance exceeds a predetermined threshold. Furthermore, the method, wherein determining that the image does not comprise a frame surrounding the face further comprises the steps of: extracting one or more contours from the image, wherein the one or more extracted contours generally surround the face; determining that each of the one or more extracted contours does not comprise at least four corners with angles approximately 90°. Moreover, the method, wherein analyzing the image to determine the diffusion of the image is within the predetermined range further comprises determining that the diffusion of the image is within a predetermined uniformity range. Further, the method, wherein analyzing the image to determine that the contrast of the image is within the predetermined range further comprises the steps of: converting the image to grayscale, wherein the converted images comprises a plurality of pixels each containing a contrast value; detecting the face in the converted image, wherein the detected face comprises at least one eye; aligning the at least one eye with a particular line; cropping the aligned image to a particular size; dividing the cropped image into a predetermined number of blocks for calculating a local contrast of each of the predetermined number of blocks, wherein the local contrast comprises a ratio of the maximum contrast value to the minimum contrast value within a particular block; and determining that a majority of the calculated local contrasts exceeds a predetermined threshold.

According to one aspect of the present disclosure, the method, wherein analyzing the image to determine that the blurriness of the image is within the predetermined range further comprises determining that the blurriness does not exceed a predetermined threshold. Additionally, the method, wherein analyzing the image to determine that the specularity of the image is within the predetermined range further comprises determining that the specularity is not interrupted and exceeds a predetermined threshold. Also, the method, wherein analyzing the image to determine that the gamut differences of the image are within the predetermined range further comprises determining that the gamut differences exceed a predetermined threshold. Furthermore, the method, wherein the electronic computing device further comprises a camera that captures the image. Moreover, the method, wherein the subject is a user of the electronic computing device attempting to access a third party system via the electronic computing device, further comprising the step of, upon verifying liveness, permitting the user to access the third party system via the electronic computing device.

Further, the method, wherein the third party system comprises an email client, a banking system, a software system, a SaaS platform, a website, a smartphone, a computer, a watch, an ATM, a vehicle, or a building.

According to one aspect of the present disclosure, the system, wherein the server, to determine that the image is not monochromatic: converts a first color space of the image to a second color space, wherein the second color space comprises two or more color components; calculates a variance in the two or more color components; and determines that the variance exceeds a predetermined threshold. Additionally, the system, wherein the server, to determine that the image does not comprise a frame surrounding the face: extracts one or more contours from the image, wherein the one or more extracted contours generally surround the face; determines that each of the one or more extracted contours does not comprise at least four corners with angles approximately 90°. Also, the system, wherein the server, to analyze the image to determine that the diffusion of the image is within the predetermined range, determines that the diffusion of the image is within a predetermined uniformity range. Furthermore, the system, wherein the server, to analyze the image to determine that the contrast of the image is within the predetermined range: converts the image to grayscale, wherein the converted images comprises a plurality of pixels each containing a contrast value; detects the face in the converted image, wherein the detected face comprises at least one eye; aligns the at least one eye with a particular line; crops the aligned image to a particular size; divides the cropped image into a predetermined number of blocks for calculating a local contrast of each of the predetermined number of blocks, wherein the local contrast comprises a ratio of the maximum contrast value to the minimum contrast value within a particular block; and determines that a majority of the calculated local contrasts exceeds a predetermined threshold.

According to one aspect of the present disclosure, the system, wherein the server, to analyze the image to determine that the blurriness of the image is within the predetermined range, determines that the blurriness does not exceed a predetermined threshold. Moreover, the system, wherein the server, to analyze the image to determine that the specularity of the image is within the predetermined range, determines that the specularity is not interrupted and exceeds a predetermined threshold. Further, the system, wherein the server, to analyze the image to determine that the gamut differences of the image are within the predetermined range, determines that the gamut differences exceed a predetermined threshold. Additionally, the system, wherein the electronic computing device further comprises a camera that captures the image. Also, the system, wherein the subject is a user of the electronic computing device attempting to access a third party system via the electronic computing device, and wherein the server, upon verifying liveness, transmits authorization to the third party system permitting the user to access the third party system via the electronic computing device. Furthermore, the system, wherein the third party system comprises an email client, a banking system, a software system, a SaaS platform, a website, a smartphone, a computer, a watch, an ATM, a vehicle, or a building.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is a flowchart showing an exemplary liveness verification process overview, according to one embodiment of the present disclosure.

FIG. 2 is a flowchart showing an exemplary imperative analysis process, according to one embodiment of the present disclosure.

FIG. 3 is a flowchart showing an exemplary dynamic analysis process, according to one embodiment of the present disclosure.

FIG. 4 illustrates an exemplary architecture of one embodiment of the disclosed system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods for verification of passive-subject liveness in digital media to prevent spoofing.

In various embodiments, the present system may be deployed in various scenarios to provide proof of liveness (also referred to herein as "liveness verification") of an image without physical interaction or movement of the subject of the image. For example, the present system may provide liveness verification as users attempt to log into or access any system protected via biometric security, such as email clients, banking systems, software systems, SaaS platforms, websites, electronic devices (e.g., smartphones, computers, watches, ATMs, etc.), cars and other vehicles, building security systems, etc. Said another way, in one embodiment, the present system may verify that an image being used for verification, authorization, or access to a system is of alive individual and not an image of an image or other type of manufactured image. In one embodiment, the present system is built into and integrated with a particular system (e.g., the particular system is enabled to perform liveness verification according to the present disclosure). In one embodiment, the present system is deployed in addition to a particular system (e.g., the particular system reaches out to the present system through APIs or other methods for liveness verification).

The liveness verification process generally begins when the system receives a request for liveness verification of an image(s) or video, as well as the image(s) or video for liveness verification. In one embodiment, the system preprocesses the image(s)/video for analysis (e.g., converting the image into different formats, resolutions, sizes, etc.; selecting image(s) for analysis; etc.). Once an image has been preprocessed, in various embodiments, the image undergoes imperative analysis and dynamic analysis. Generally, imperative analysis is the process by which the disclosed system uses various non-machine learning based methodologies (e.g., color detection, contour detection, etc.) according to one or more predefined rules to verify liveness in the preprocessed image. Generally, dynamic analysis is the process by which the disclosed system uses various machine learning based methodologies (e.g., diffusion speed, face contrast, blurriness, specularity, etc.) to verify liveness in the preprocessed image.

In various embodiments, the system determines liveness of the image based on the results of the imperative analysis and the dynamic analysis, neither of which require interaction from the subject of the image. Once the system has determined liveness (or not), in one embodiment, the system transmits the results of the liveness verification for further action as appropriate (e.g., permitting access, denying access, requesting additional verification, etc.).

Exemplary Embodiments

Referring now to the figures, for the purposes of example and explanation of the fundamental processes and components of the disclosed systems and methods, reference is made to FIG. 1, which illustrates an exemplary, high-level liveness verification process overview 100 according to one embodiment of the present disclosure. The exemplary, high-level process 100 shown in FIG. 1, as will be understood and appreciated, represents merely one approach or embodiment of the present system, and other aspects are used according to various embodiments of the present system. As will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown.

In various embodiments, the present system may be deployed in various scenarios to provide proof of liveness (also referred to herein as "liveness verification") of an image without physical interaction or movement of the subject of the image. For example, the present system may provide liveness verification as users attempt to log into or access any system protected via biometric security, such as email clients, banking systems, software systems, SaaS platforms, websites, electronic devices (e.g., smartphones, computers, watches, ATMs, etc.), cars and other vehicles, building security systems, etc. Said another way, in one embodiment, the present system may verify that an image being used for verification, authorization, or access to a system is of alive individual and not an image of an image or other type of manufactured image. In one embodiment, the present system is built into and integrated with a particular system (e.g., the particular system is enabled to perform liveness verification according to the present disclosure). In one embodiment, the present system is deployed in addition to a particular system (e.g., the particular system reaches out to the present system through APIs or other methods for liveness verification).

In one non-limiting example of the present system, a user attempts to log into a software program using biometric identification of the user's face, which necessitates proof of liveness. Generally, continuing with this example, the user will be prompted to position his/her face in front of a camera. As the camera takes the image (or records a video), the image is sent for liveness verification in accordance with one embodiment of the present disclosure. Generally, in various embodiments, the image(s) (or video) undergoes a liveness verification process 100 that determines, according to the various methodologies disclosed herein, whether the image is of a live person or has been spoofed. If liveness is verified, in one embodiment, then the user will be permitted to access the software program. If liveness cannot be verified, in one embodiment, then the user will be denied access to the software program, permitted access to the software program but only in a limited/reduced or monitored capacity, or required to provide additional verification (e.g., password, new image for liveness verification, answer security questions, etc.). In some embodiments, an alert of attempted access may be sent to a system operator or user, if liveness cannot be verified.

In various embodiments, the liveness verification process 100 generally begins, at step 102, when the system receives a request for liveness verification of an image(s) or video, as well as the image(s) or video for liveness verification, from a third party system (e.g., in response to a request to log into the third party system, etc.). In one embodiment, at step 104, the system preprocesses the image(s)/video for analysis. As will occur to one having ordinary skill in the art, the type and form of preprocessing generally depends on the subsequent analysis to be performed on the image, as well as the current format of the image. For example, in various embodiments, an image may be converted into different formats, resolutions, sizes, etc. In one embodiment, the preprocessing at step 104 may comprise splitting a video out into its individual frames and selecting (e.g., randomly, via a sampling algorithm, according to predefined rules, etc.) a still image or images from the video for analysis. Thus, although reference is generally made herein to a singular image, the liveness verification process 100 may be run on any number of images (e.g., the liveness verification process 100 may compare two images taken seconds apart, a video broken down into its individual frames/images, etc.).

Once an image has been preprocessed, in various embodiments, the image undergoes imperative analysis 200 (further details of which will be discussed in association with the description of FIG. 2) and dynamic analysis 300 (further details of which will be discussed in association with the description of FIG. 3). Generally, imperative analysis 200 is the process by which the disclosed system uses various non-machine learning based methodologies (e.g., color detection, contour detection, etc.) according to one or more predefined rules to verify liveness in the preprocessed image. Generally, dynamic analysis 300 is the process by which the disclosed system uses various machine learning based methodologies (e.g., diffusion speed, face contrast, blurriness, specularity, etc.) to verify liveness in the preprocessed image. In one embodiment, if the imperative analysis 200 indicates liveness, then the image does not undergo dynamic analysis 300. In one embodiment, if the dynamic analysis 300 indicates liveness, then the image does not undergo imperative analysis 200. In one embodiment, the image undergoes both imperative analysis 200 and dynamic analysis 300. Generally, imperative analysis 200 may be better suited for some images than dynamic analysis 300 and vice versa, so the system may determine, based on the received image, the appropriate analysis 200 or 300 to employ. For example, videos will generally be more accurately analyzed via dynamic analysis 300, so the system may only use dynamic analysis 300 for liveness verification of a received video.

In various embodiments, the system determines liveness of the image at step 106 based on the results of the imperative analysis 200 and/or the dynamic analysis 300. At step 106, in one embodiment, the system aggregates these results via a classifier using a probabilistic based approach (e.g., determining a percentage chance that a subject in the image is live based on weighting the results of the analyses 200 and 300). The classifier can generally be calibrated (either automatically via machine learning or manually) to weigh results of one analysis over the other based on various criteria (e.g., past success overall, past success with similar images, etc.). At step 106, in one embodiment, the system only determines liveness if both of the analyses 200 and 300 indicate liveness. At step 106, in one embodiment, the system determines liveness if either of the analyses 200 and 300 indicate liveness. Once the system has determined liveness (or not), at step 108, in one embodiment, the system transmits the results of the liveness verification to a third party system, wherein the third party system takes further actions as appropriate (e.g., permitting access, denying access, etc.), and the liveness verification process 100 ends thereafter.

Referring now to FIG. 2, an exemplary imperative analysis process 200 is shown according to one embodiment of the present system. The imperative analysis 200 is generally the process by which the disclosed system uses various non-machine learning based methodologies (e.g., color detection, contour detection, etc.) according to one or more predefined rules to verify liveness in the preprocessed image(s). In various embodiments, the imperative analysis 200 begins at step 202, wherein the system receives the preprocessed image(s) for analysis.

In one embodiment, at step 204, the system analyzes the image's color space to determine whether the image is monochromatic (e.g., in black and white, sepia, etc.) when it should be polychromatic, which would indicate that an attacker is using a non-color photograph to spoof the image. For example, in one embodiment, at step 204, the system may convert the color space of the image (e.g., from RGB to YUV, etc.) to calculate the variance in the color components of the image (e.g., generally, in the YUV color space, Y determines brightness of the color and both U and V determine the color itself; thus, a variance between the U and V may be calculated). In one embodiment, if the variance is below a certain threshold (e.g., 10, 15, 25, 35, etc.), then the image is monochromatic. Thus, at step 206, the system determines, based on the analysis of step 204, whether the image is monochromatic and, therefore, whether the image could be of a live subject.

In one embodiment, at step 208, the system extracts contours (e.g., hard lines) from the image to determine whether the image is of a photograph. Generally, at step 208, the system may use a variety of methods to extract contours (e.g., Laplacian, Gaussian, Sobel, Scharr, Canny, simple thresholding, adaptive thresholding, etc.). At step 210, the system determines whether the image contains a frame (e.g., the edges of a photograph held in front of a camera) by merging the results of contour extraction from step 208 into a single image (with, in one embodiment, manually chosen weights given to each method) and searches to identify a contour that could be a frame (e.g., a contour with four corners with all of its angles close to 90 degrees or 5 corners with one angle close to 180 degrees and the others close to 90 degrees, etc.). If a frame is identified, in one embodiment, then the system determines whether there is a face within the frame. If a face within the frame is identified, then the image is likely spoofed.

Generally, at step 212, the system compiles the results of the color check of steps 204-206 and the frame check of steps 208-210 and transmits those results for further analysis, after which the imperative analysis 200 ends. The imperative analysis 200, in various embodiments, may comprise all of steps 202-212, only steps 202-206 and 212 (if liveness is determined at step 206), or only steps 202 and 208-212 (if liveness is determined at step 210).

Now referring to FIG. 3, an exemplary dynamic analysis process 300 is shown according to one embodiment of the present system. The dynamic analysis 300 is generally the process by which the disclosed system uses various machine learning-based methodologies (e.g., diffusion speed, face contrast, blurriness, specularity, gamut differences, 3D modeling, frequency analysis, texture analysis, etc.) to verify liveness in the preprocessed image(s).

In various embodiments, the dynamic analysis 300 begins at step 302, wherein the system receives the preprocessed image(s) for analysis. Generally, at step 304, the system selects a method for analysis of the image (e.g., diffusion speed, face contrast, blurriness, specularity, gamut differences, 3D modeling, frequency analysis, texture analysis, etc.). In one embodiment, the method selected is determined based on the characteristics of the preprocessed image (e.g., size, format, etc.). In one embodiment, the method selected is determined based on the level of security/certainty required by the system. Generally, the methods employ deep learning algorithms that look for patterns within spoofed and non-spoofed images in a training dataset to determine liveness. Thus, at step 306, in various embodiments, the system analyzes an image according to the selected method.

For example, at step 306, to determine liveness based on diffusion speed of the image (e.g., smoothing an image without losing the edges of the image), a learning algorithm, based on a support vector machine, can process the image to determine if the image falls into a threshold of being uniform enough to be classified as a spoofed image by calculating the absolute difference between the original preprocessed image and a diffused version of the same in logarithmic scale space (e.g., spoofed images generally exist in a 2D plane—paper photograph, tablet screen—that makes them more uniform by reducing random light reflect, which results in a slower diffusion rate). Further details of diffusion speed liveness detection are discussed in Wonjun Kim et al., *Face Liveness Detection From a Single Image via Diffusion Speed Model*, 24.8 IEEE Transactions on Image Processing 2456 (2015), which is incorporated herein by reference.

To determine liveness based on physics-based features (e.g., face contrast, gamut differences, etc.), for example, at step 306, the system calculates the physics-based features and then combines the results into a single vector that can be used as in input for linear support vector machines (e.g., "SVM" or "support vector networks"), which are supervised learning models with associated learning algorithms that analyze data used for classification and regression analysis.

Generally, the system converts the image to grayscale, detects the face in the image, aligns the image so that one eye of the face lies on a particular line, crops the image to a predetermined size, and divides the image into a predetermined number of blocks.

In one embodiment, the system determines chromaticity, which reveals gamut differences between the original image and the image after it was processed approximately two additional times by different recapturing devices (e.g., a printer that prints the image and a camera that takes a photo of the printed image, etc.). Generally, the image is converted to a different color space (e.g., CIE 1931 XYZ, RGB, etc.) and divided into blocks for which a symmetric covariance matrix (e.g., 2×2, 4×4, etc.) is computed for every block. In one embodiment, the elements in the upper triangular portion of the matrix are the chromaticity measure for a block. Generally, spoofed images have smaller chromaticity measures than live images.

In one embodiment, gamut differences that manifest as recapturing artifacts (e.g., red tint for printed photographs, blue tint for redisplayed photographs, etc.) may be visible in spoofed images so the system calculates a Hue Saturation Value (HSV) color histogram. Generally, this histogram is then analyzed by the algorithm to determine if results fall within the sufficient thresholds for a live image (e.g., lacking red or blue tints, etc.).

In one embodiment, the contrast ratios of the face in the image may be compared by diving the image into blocks and calculating a local contrast (e.g., ratio of the maximum to the minimum pixel values) to develop a contrast measurement of a particular block. Generally, spoofed images have lower contrast ratios than live images.

Further details of physics-based features for liveness detection are discussed in Zinting Gao et al., *Single-view Recaptured Image Detection Based on Physics-based Features*, ICME (2010), which is incorporated herein by reference.

To determine liveness based on blurriness, for example, at step 306, in one embodiment, the system determines the clarity of the lines within an image using various image processing techniques. Generally, blurriness occurs when a spoofed image has low resolution or the spoofed image is placed too close to the camera such that it is out of focus (e.g., because it is small).

To determine liveness based on specularity, for example, at step 306, in one embodiment, the system decomposes the image to get its specular component, divides it into blocks, and calculates the specularity (e.g., regular reflections) for each block. Specularity usually indicates the geometry of the subject of a photo. Generally, specularity may be disrupted by reflections off of a screen (or off of glossy paper) displaying the spoofed image. Similarly, printed pictures, because they are flat, generally do not have the same specularity as live images. Thus, in one embodiment, the system may prompt the camera taking the picture to shine a light (e.g., flash, laser focus, etc.) on the subject to increase the specularity of a particular image for further analysis.

To determine liveness based on texture analysis, for example, at step 306, in one embodiment, the system converts the image to grayscale, crops the image to show only the subject's face, and resizes the image to a manageable size (e.g., from 64×64 to 512×512). In one embodiment, the system computes local binary patterns with "radius" set to small number (e.g., 1, 2, etc.) and "number of points" set to 8. Generally, this transformation highlights the locations in the preprocessed image where there is a change in texture (e.g., from screen to hand, printed photograph to air, etc.).

The system then computes a histogram of the transformed image, which is run through a linear SVM classifier, to determine whether the image is spoofed.

To determine liveness based on frequency analysis, for example, at step 306, in one embodiment, the system converts the image to grayscale, crops the image to show only the subject's face, and resizes the image to a manageable size (e.g., from 64×64 to 512×512). In one embodiment, the system computes the frequency domain of the image by means of Fast Fourier Transform, which is further normalized by computing magnitude and log of the transformed image. Generally, this transformation yields a matrix showing the power of every frequency used in the original image. In one embodiment, this matrix is split into concentric rings (e.g., 4, 8, 16, 32, etc.), and the mean value of each ring is computed. After normalization, the means of all rings are generally passed through a linear SVM classifier as a feature vector. If there is a lot of variance in the means, then there is a high chance that the image is live, while the spoofed images tend to have less variance.

To determine liveness based on 3D modeling, for example, at step 306, in one embodiment, a selection of frames (e.g., still images) from a video are used to build a 3D model of the subject's face, which is compared to a trained representation of a human face. Generally, the closer the modeled image resembles the representation, the less likely the image is spoofed. In one embodiment, to generate the 3D model, the subject is asked to move the camera or his/her face in a particular manner (e.g., pushing the phone away or pulling it towards a face, using circular moves around a face while holding a phone, moving the head left and right, generally shaking the head around, etc.). Generally, in one embodiment, at least 4-6 images are selected of the face in different positions. The selected images are combined based on multiple facial landmarks (e.g., eyebrows, eyes, nose, etc.), and the distances between these landmarks are calculated (e.g., using sine, cosine, etc.). Generally, the system determines a shape error (e.g., certainty that the 3D model is an actual face). If the shape error is within an appropriate threshold, then images are generally not spoofed.

After analyzing an image according to the selected method at step 306, in various embodiments, the system determines whether additional analysis is appropriate at step 308. For example, if the analysis conducted was inconclusive or additional certainty is desired, then the additional analysis may be appropriate. If additional analysis is appropriate, then the system returns to step 304 and selects a new method for analysis (e.g., diffusion speed, face contrast, blurriness, specularity, gamut differences, 3D modeling, frequency analysis, texture analysis, etc.).

If additional analysis is not appropriate, then the system proceeds to step 310, wherein it compiles the results of the analyses. For example, if the results (or a weighted average or aggregate of multiple results) meet a certain confidence measure or are above a certain threshold, then the system may proceed to step 310. After compiling the results, the system, at step 312, transmits the results for determination of liveness, and the dynamic analysis 300 ends thereafter.

Referring now to FIG. 4, an exemplary architecture 400 is shown according to one embodiment of the disclosed system. In one embodiment, a liveness verification system 101 performs and conducts the liveness verification process 100 (discussed in association with the description of FIG. 1). In various embodiments, the liveness verification system 101 comprises an imperative analysis engine 201 and a dynamic analysis engine 301. Generally, the liveness verification system 101 (and its engines 201 and 301) may be any computing device (e.g., desktop computer, laptop, servers, tablets, etc.), combination of computing devices, software, hardware, or combination of software and hardware that is capable of performing the functionality disclosed herein. In one embodiment, the imperative analysis engine 201 conducts the imperative analysis 200 (discussed in association with the description of FIG. 2). In one embodiment, the dynamic analysis engine 301 conducts the dynamic analysis 300 (discussed in association with the description of FIG. 3). In various embodiments, the liveness verification system 101 is operatively connected to a third party system 402 and an electronic computing device 404 via network 406 to conduct the processes/analyses disclosed herein. Generally, network 406 may any connection capable of transferring data between two or more computer systems (e.g., a secure or unsecured connection, Bluetooth, wireless or wired local-area networks (LANs), cell network, the Internet, etc.).

Generally, the third party system 402 may be any computing device (e.g., desktop computer, laptop, servers, tablets, etc.), combination of computing devices, software, hardware, or combination of software and hardware that is capable of performing the functionality disclosed herein. In various embodiments, the third party system 402 communicates via network 406 with the liveness verification system 101 and electronic computing device 404 as part of the liveness verification process 100. In one embodiment, the third party system 402 is the system that requests liveness verification.

Generally, the electronic computing device 404 is any device that is capable of performing the functionality disclosed herein (e.g., desktop computer, laptop computer, tablet computer, smartphone, smartwatch, camera, video camera, image capture device, etc.). In various embodiments, the electronic computing device 404 communicates via network 406 with the liveness verification system 101 and third party system 402 as part of the liveness verification process 100. In one embodiment, the electronic computing device 404 is the device through which the user is attempting to access the third party system 402 and via which the image is taken for which liveness verification is requested. In one embodiment, the electronic computing device 404 has a camera or other image capture device and takes the image in real time with the request to access the third party system 402.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method of verifying liveness of a subject shown in an image file, comprising the steps of:
   selecting one or more particular liveness analyses to be performed in relation to at least a portion of an image file;
   preprocessing the image file for the one or more particular liveness analyses, thereby producing at least one preprocessed image, wherein the preprocessed image purports to show a subject's face, wherein preprocessing the image file comprises:
      selecting one or more particular preprocessing methodologies based at least in part on the one or more particular liveness analyses, each of the one or more particular preprocessing methodologies corresponding to at least one particular liveness analysis of the one or more particular liveness analyses; and
      performing the one or more particular preprocessing methodologies to thereby produce the at least one preprocessed image;
   performing the one or more particular liveness analyses on the at least one preprocessed image by at least:
      performing an imperative analysis on the at least one preprocessed image; and
      performing a dynamic analysis on the at least one preprocessed image; and
   determining liveness of the subject based on a result of the imperative analysis and a result of the dynamic analysis.

2. The method of claim 1, wherein performing the dynamic analysis on the preprocessed image comprises analyzing the preprocessed image to determine that at least one of the following regarding the preprocessed image is within a predetermined range: diffusion speed, contrast, blurriness, specularity, texture, frequency, or gamut differences.

3. The method of claim 2, wherein the subject is a user of an electronic computing device attempting to access a third party system via the electronic computing device, and wherein the method further comprises the step of, in response to verifying liveness of the subject based on the result of the imperative analysis and/or the result of the dynamic analysis, permitting the user to access the third party system via the electronic computing device.

4. The method of claim 3, wherein the third party system comprises an email client, a banking system, a software system, a SaaS platform, a website, a smartphone, a computer, a watch, an ATM, a vehicle, or a building.

5. The method of claim 3, wherein the electronic computing device comprises a camera with a flash configured to capture the image file, and wherein prior to determining specularity, the electronic computing device receives a signal for engaging the flash for illuminating the subject's face.

6. The method of claim 2, wherein performing the dynamic analysis on the preprocessed image comprises performing a texture analysis on the preprocessed image by at least:
   converting the preprocessed image to generate a grayscale version of the preprocessed image;

cropping the grayscale version of the preprocessed image to thereby provide a cropped grayscale version of the preprocessed image comprising only the subject's face; and
   generating a resized image from the cropped grayscale version of the preprocessed image, wherein the resized image is larger than the cropped grayscale version of the preprocessed image.

7. The method of claim 6, wherein performing the dynamic analysis on the preprocessed image comprises performing a frequency analysis by at least computing a fast fourier transform on the resized image.

8. The method of claim 1, wherein performing the imperative analysis comprises performing contour detection on the preprocessed image for determining that the preprocessed image does not comprise a frame surrounding the subject's face.

9. The method of claim 8, wherein performing contour detection comprises:
   extracting one or more contours from the preprocessed image, wherein the one or more contours generally surround the subject's face; and
   determining that each of the one or more contours does not comprise at least four corners with angles approximately 90 degrees.

10. The method of claim 1, wherein preprocessing the image file comprises converting the image file into a different format, a different resolution, or a different image size.

11. The method of claim 1, wherein:
   the image file comprises a video; and
   preprocessing the image file comprises:
      extracting a plurality of extracted images from the video; and
      selecting at least one image from the plurality of extracted images.

12. The method of claim 11, wherein selecting the at least one image from the plurality of extracted images comprises randomly selecting one or more extracted images from the plurality of extracted images to thereby provide the at least one image.

13. The method of claim 11, wherein selecting the at least one image from the plurality of extracted images comprises applying a sampling algorithm and/or one or more predefined rules.

14. A system for verifying liveness of a subject shown in an image, comprising:
   a server operatively configured to:
      receive an image that purports to show a subject's face;
      select one or more particular liveness analyses to be performed in relation to at least a portion of the image;
      preprocess the image for the one or more particular liveness analyses, thereby producing at least one preprocessed image, wherein preprocessing the image comprises:
         selecting one or more particular preprocessing methodologies based at least in part on the one or more particular liveness analyses, each of the one or more particular preprocessing methodologies corresponding to at least one particular liveness analysis of the one or more particular liveness analyses; and
         performing the one or more particular preprocessing methodologies to thereby produce the at least one preprocessed image;
      perform an imperative analysis on the at least one preprocessed image;

perform a dynamic analysis on the at least one preprocessed image; and determine liveness of the subject based on a result of the imperative analysis and a result of the dynamic analysis.

15. The system of claim 14, wherein performing the dynamic analysis on the at least one preprocessed image comprises analyzing the at least one preprocessed image to determine that at least one of the following regarding the at least one preprocessed image is within a predetermined range: diffusion speed, contrast, blurriness, specularity, texture, frequency, or gamut differences.

16. The system of claim 15, wherein the subject is a user of an electronic computing device attempting to access a third party system via the electronic computing device, and wherein the server is further operatively configured to, in response to verifying liveness of the subject based on the result of the imperative analysis and/or the result of the dynamic analysis, permitting the user to access the third party system via the electronic computing device.

17. The system of claim 16, wherein the third party system comprises an email client, a banking system, a software system, a SaaS platform, a website, a smartphone, a computer, a watch, an ATM, a vehicle, or a building.

18. The system of claim 16, wherein the electronic computing device comprises a camera with a flash configured to capture the image, and wherein prior to determining specularity, the electronic computing device receives a signal for engaging the flash for illuminating the subject's face.

19. The system of claim 15, wherein performing the dynamic analysis on the at least one preprocessed image comprises performing a texture analysis on the at least one preprocessed image by at least:

converting the at least one preprocessed image to generate a grayscale version of the at least one preprocessed image;

cropping the grayscale version of the at least one preprocessed image to thereby provide a cropped grayscale version of the at least one preprocessed image comprising only the subject's face; and generating a resized image from the cropped grayscale version of the at least one preprocessed image, wherein the resized image is larger than the cropped grayscale version of the at least one preprocessed image.

20. The system of claim 19, wherein performing the dynamic analysis on the at least one preprocessed image comprises performing a frequency analysis by at least computing a fast fourier transform on the resized image.

21. The system of claim 14, wherein performing the imperative analysis comprises performing contour detection on the at least one preprocessed image for determining that the at least one preprocessed image does not comprise a frame surrounding the subject's face.

22. The system of claim 21, wherein performing contour detection comprises:

extracting one or more contours from the at least one preprocessed image, wherein the one or more contours generally surround the subject's face; and determining that each of the one or more contours does not comprise at least four corners with angles approximately 90 degrees.

23. The system of claim 14, wherein performing the dynamic analysis on the at least one preprocessed image comprises performing one or more machine learning-based image processing methodologies on the at least one preprocessed image, the one or more machine learning-based image processing methodologies being operatively configured to identify patterns indicative of liveness in the preprocessed image based on a processing of spoofed images and non-spoofed images in a training dataset.

24. A tangible, non-transitory, computer-readable medium comprising instructions encoded therein, wherein the instructions, when executed by one or more processors, cause the one or more processors to:

select one or more liveness analyses to be performed in relation to at least one image of an image file based on one or more considerations, wherein the image file purports to show a subject's face;

preprocess the at least one image to provide at least one preprocessed image, wherein preprocessing the at least one image comprises:

selecting one or more particular preprocessing methodologies based at least in part on the one or more liveness analyses to be performed, each of the one or more particular preprocessing methodologies corresponding to at least one liveness analysis of the one or more liveness analyses; and performing the one or more particular preprocessing methodologies to thereby provide the at least one preprocessed image;

perform an imperative analysis on the at least one preprocessed image;

perform a dynamic analysis on the at least one preprocessed image; and determine liveness of the subject based on a result of the imperative analysis and a result of the dynamic analysis.

25. The tangible, non-transitory, computer-readable medium of claim 24, wherein:

performing the dynamic analysis on the at least one preprocessed image comprises analyzing the at least one preprocessed image to determine that at least one of the following regarding the at least one preprocessed image is within a predetermined range: diffusion speed, contrast, blurriness, specularity, texture, frequency, or gamut differences; and performing the imperative analysis comprises performing contour detection on the at least one preprocessed image for determining that the at least one preprocessed image does not comprise a frame surrounding the subject's face.

26. A method comprising:

selecting one or more liveness analyses to be performed in relation to at least one image of an image file based on one or more considerations, wherein the image file purports to show a subject's face;

preprocessing the at least one image to provide at least one preprocessed image, wherein preprocessing the at least one image comprises:

selecting one or more particular preprocessing methodologies based at least in part on the one or more liveness analyses to be performed, each of the one or more particular preprocessing methodologies corresponding to at least one liveness analysis of the one or more liveness analyses; and performing the one or more particular preprocessing methodologies to thereby provide the at least one preprocessed image;

performing the one or more liveness analyses by performing at least one of:

an imperative analysis on the at least one preprocessed image; or a dynamic analysis on the at least one preprocessed image; and determining liveness of the subject based on the one or
  more liveness analyses.

27. The method of claim 26, wherein the one or more
considerations comprises an analysis of the image file.

28. The method of claim 26, wherein the one or more
considerations comprises a required level of security regard-
ing liveness or a required level of certainty regarding
liveness.

\* \* \* \* \*